(12) United States Patent
Lingel et al.

(10) Patent No.: US 10,518,691 B2
(45) Date of Patent: Dec. 31, 2019

(54) LOW PROFILE SUMP AND HIGH EFFICIENCY SUCTION

(71) Applicant: United Plastic Fabricating, Inc., North Andover, MA (US)

(72) Inventors: F. Joseph Lingel, North Andover, MA (US); Andrew Lingel, Newton, NH (US); Stanley Wojnowski, Mendon, MA (US); Michael Ashley, Ipswich, MA (US)

(73) Assignee: United Plastic Fabricating Inc., North Andover, MA (US)

( * ) Notice: Subject to any disclaimer, the term of this patent is extended or adjusted under 35 U.S.C. 154(b) by 0 days.

(21) Appl. No.: 14/701,579

(22) Filed: May 1, 2015

(65) Prior Publication Data

US 2015/0314917 A1 Nov. 5, 2015

Related U.S. Application Data

(60) Provisional application No. 61/987,010, filed on May 1, 2014.

(51) Int. Cl.
*B67D 7/78* (2010.01)
*B60P 3/22* (2006.01)

(52) U.S. Cl.
CPC .......... *B60P 3/225* (2013.01); *B67D 7/78* (2013.01)

(58) Field of Classification Search
CPC ..... Y10T 137/86348; Y10T 137/86372; Y10T 137/86364; B67D 3/0048; B67D 3/04
USPC ....... 137/565.37, 592, 590, 591, 590.5, 147, 137/140, 125; 222/464.7, 464.1, 464.2, 222/464.3, 464.4, 464.5, 464.6; 220/562, 220/563, 564, 571, 573

See application file for complete search history.

(56) References Cited

U.S. PATENT DOCUMENTS

| | | | | | |
|---|---|---|---|---|---|
| 518,776 | A | * | 4/1894 | Campbell | F16K 31/26 137/390 |
| 627,716 | A | * | 6/1899 | Burgholz | A01J 11/12 137/140 |
| 1,006,332 | A | * | 10/1911 | Wilson | B60K 15/06 137/590 |
| 1,493,843 | A | * | 5/1924 | Conrader | F16K 17/42 137/590 |
| 1,821,503 | A | * | 9/1931 | Erdman | B08B 9/0933 137/591 |
| 3,319,652 | A | * | 5/1967 | Custer | B67D 1/0829 137/590 |
| 3,391,707 | A | * | 7/1968 | Riley | B01J 47/022 137/590 |
| 3,612,079 | A | * | 10/1971 | Schillinger | C02F 1/006 137/1 |
| 7,434,602 | B2 | * | 10/2008 | Barone | B65D 47/18 141/112 |
| 2005/0284884 | A1 | * | 12/2005 | Roy-Wedderburn | C12G 1/0206 222/105 |

(Continued)

*Primary Examiner* — Allan D Stevens
(74) *Attorney, Agent, or Firm* — Maine Cernota & Rardin

(57) ABSTRACT

A system is provided for providing enhanced suction evacuation of a fluid storage tank, the system having a suction pipe disposed parallel and proximate to the bottom of the tank, having a section of the pipe proximal to the bottom of the tank being an opening through which the liquid is evacuated. The system may further provide a sump that is disposed on the bottom of the tank and not aligned with the opening of the suction pipe.

11 Claims, 2 Drawing Sheets

(56) References Cited

U.S. PATENT DOCUMENTS

| | | | | |
|---|---|---|---|---|
| 2008/0190497 A1* | 8/2008 | Varda | ............... | F15B 1/26 |
| | | | | 137/574 |
| 2009/0008414 A1* | 1/2009 | Tingsley | ............. | B05B 11/0037 |
| | | | | 222/377 |
| 2013/0284751 A1* | 10/2013 | Rund | ............... | B60K 15/01 |
| | | | | 220/600 |
| 2015/0343471 A1* | 12/2015 | Kim | ............... | B05B 11/3001 |
| | | | | 222/464.2 |

* cited by examiner

LOW PROFILE SUMP AND HIGH EFFICIENCY SUCTION

RELATED APPLICATIONS

This application claims the benefit of U.S. Provisional Application No. 61/987,010, filed May 1, 2014. This application is herein incorporated by reference in its entirety for all purposes.

FIELD OF THE INVENTION

The invention relates to liquid tank suctions and sumps, and more particularly, to a low profile sump configuration with improved laminar efficiency suction.

BACKGROUND OF THE INVENTION

Existing suction pipes for extracting fluid from a liquid transport tank, such as that of fire truck typically comprises a pipe, parallel to the bottom of the tank with a 90° elbow coupled to its interior end and angled down. The right angle bend in the suction pipe disrupts laminar flow of liquid into the pipe, creating resistance and decreasing efficiency.

To allow sufficient clearance, such an elbow is typically positioned over the sediment sump, a required depression and cleaning port located at the lowest point of the tank to allow particulates and debris that might accumulate in the tank to be removed. The positioning of the elbow over the sump, while allowing greater inflow into the suction also results in disturbance of the sediment in the sump and its mixing with the liquid being pumped through the suction. This defeats the purpose of the requirement for a sump.

One way to improve sump performance in such a situation is to make the sump deeper. This too has significant practical disadvantages, notably, a sump that extends more than 3 inches beyond the bottom of the tank may impinge on other structures installed in the truck, requiring extensive reconstruction of tanks to fit trucks from different manufacturers.

What is needed, therefore, are techniques for providing a tank with a low profile sump and high efficiency suction.

SUMMARY OF THE INVENTION

One embodiment of the present invention provides a system for evacuation of a fluid storage tank, the system comprising: a suction pipe disposed proximate to a bottom of the tank and having a major axis parallel to the bottom of the tank; an opening disposed in a wall of the suction pipe, disposed opposite to the bottom of the tank.

Another embodiment of the present invention provides such a system wherein a sump is disposed in the bottom of the tank, the sump being disposed so that it is not in alignment with the opening of the suction pipe.

A further embodiment of the present invention provides such a system wherein the sump is not more than 1 inch deep.

Yet another embodiment of the present invention provides such a system wherein the opening comprises an arc section of the pipe being not greater than ½ the circumference of the pipe.

A yet further embodiment of the present invention provides such a system further comprising a terminus disposed at the end of the suction pipe.

Still another embodiment of the present invention provides such a system further comprising a suction support.

A still further embodiment of the present invention provides such a system wherein the suction support is disposed at an end of the suction pipe.

Even another embodiment of the present invention provides such a system wherein the suction pipe has a circular cross section.

An even further embodiment of the present invention provides such a system wherein the suction pipe has a rectilinear, square or oval cross section.

One embodiment of the present invention provides a fluid storage tank sump, the sump comprising: a depression disposed in a bottom of a fluid storage tank; and the depression having a depth not greater than a thickness of the bottom of the fluid storage tank.

Another embodiment of the present invention provides such a sump wherein the depression is circular.

A further embodiment of the present invention provides such a sump further comprising a cleanout aperture.

Still another embodiment of the present invention provides such a sump wherein the depression is rectangular.

A still further embodiment of the present invention provides such a sump, wherein the sump is offset from a suction pipe such that an opening of the suction pipe is not disposed over the sump.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
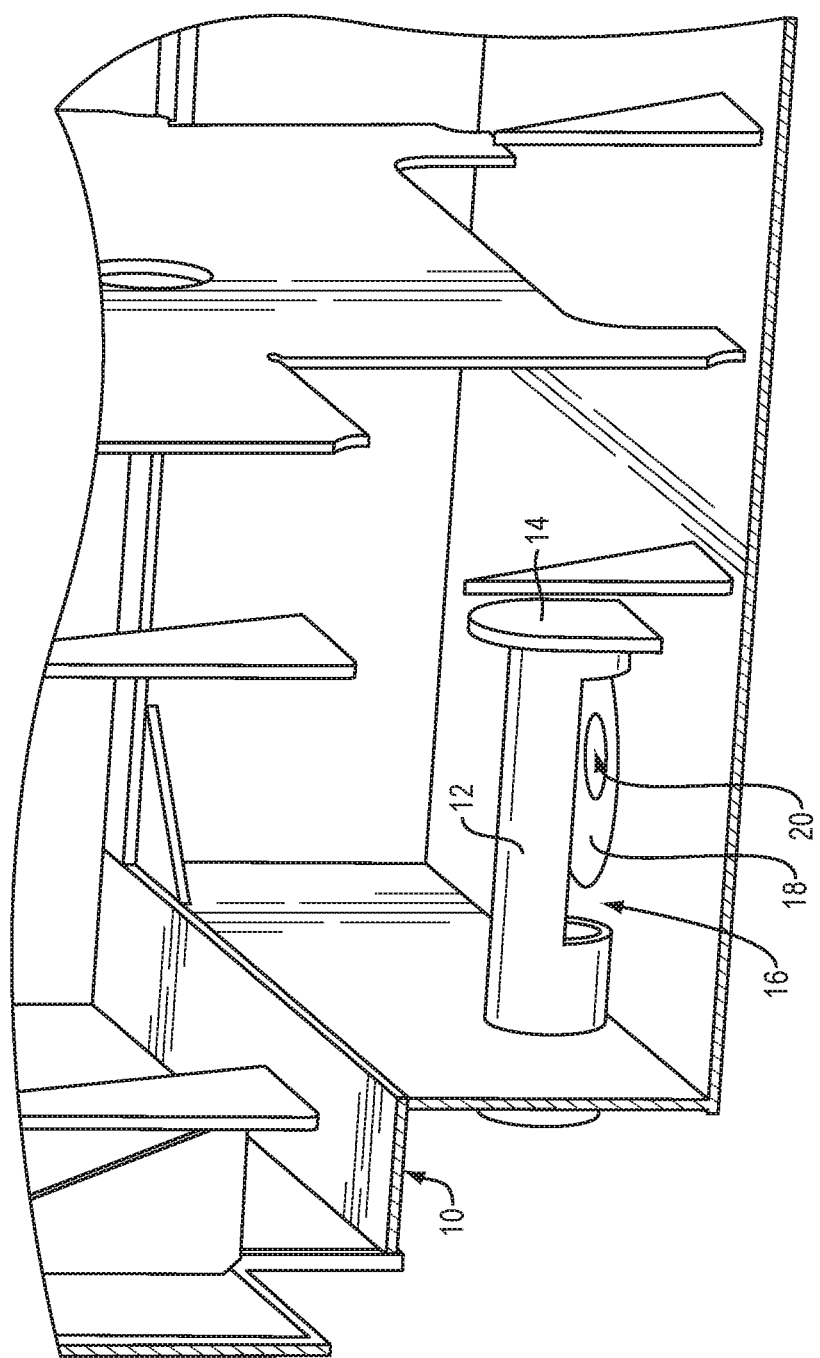
FIG. 1 is a side perspective drawing illustrating a tank with a suction outflow configured in accordance with one embodiment of the present invention.
Figure 2:
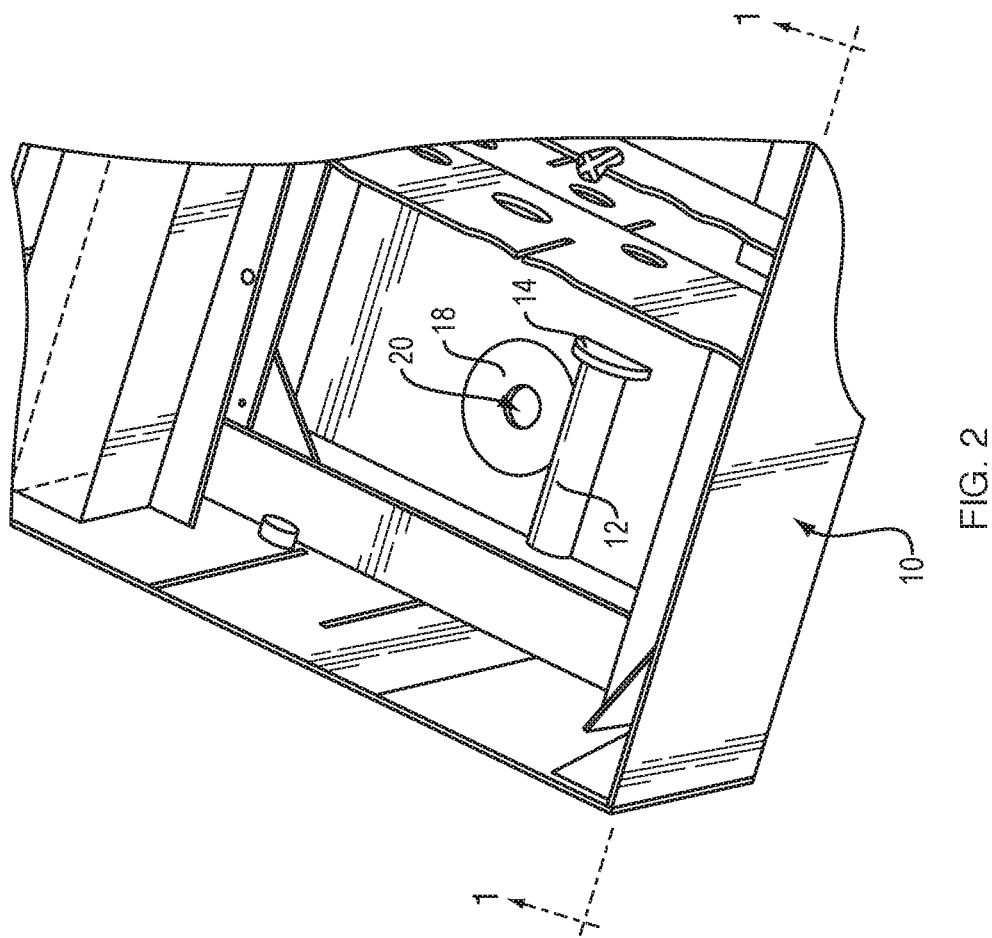
FIG. 2 is a top perspective drawing illustrating a tank with a suction outflow configured in accordance with one embodiment of the present invention and having an offset sump.

In one embodiment of the present invention, illustrated in FIG. 1, a tank 10 is provided having a suction pipe 12 installed. The Suction pipe 12 extends into the tank 10 proximate to the bottom of the tank, yet not touching it. A terminus and support 14 is disposed at the interior end of the pipe 12. An opening 16 of ½ of the pipe wall circumference is cut from the pipe 12. The opening 16 length is configured to allow unrestricted passage of liquid through the opening thus formed, with the opening positioned to face the bottom of the tank 10. One or more baffles may be installed in the tank as necessary to reduce fluid displacement within the tank during transport.

The suction pipe 12 opening 16 is positioned so that the opening section is proximate to the bottom of the tank. The opening 16 varies in length and location relative to the pump interface. The positioning of the opening 16 is dependent on other features and characteristics of the tank such as baffle plates and structural supports.

Similarly, the suction pipe diameter can be selected by the truck end manufacturer in a range from one inch to eight inches depending on the rate in which the liquid is designed to be removed from the storage tank.

In one embodiment of the present invention, a sump 18 may be provided, offset from the suction pipe 12. In such an embodiment, the sump 18 may be shallower than is typical, extending in one embodiment only to 1 inch beyond the exterior of the tank bottom. In one embodiment, the sump 18 may be circular with a circular depression at its center which may have a depth equal to the thickness of the floor 22 of said tank. One skilled in the art will appreciate that the sump 18 may be rectilinear or some other suitable shape. The sump 18 may be configured to be removed for cleaning, or equipped with a clean-out port 20, which may be accessed for removing sediment. Sump separation from the suction prevents the sediment and debris from entering the pump inlet and downstream screens, nozzles, and orifices. Should the sediment be allowed to enter the flow path, an interruption of fluid flow may occur, resulting in higher required vacuum levels to maintain a steady state flow rate. Debris, if of sufficient size and physical characteristics, may result in damage to the pump rotating parts. Known systems align the sump, as the deepest part of the tank with the intake of the pipe to allow for more complete evacuation of the tank. It has been found that embodiments of the present invention achieve improved evacuation and need not rely on this alignment.

The mobile liquid storage tank requires baffles to minimize the effects of media movement that may cause instability of the vehicle while braking, accelerating, or cornering. The baffles negatively impact the flow of liquid into the suction inlet particularly at higher velocities. Higher efficiency suction results in lower liquid velocities, and resulting turbulence, thereby increasing the system evacuation efficiency.

Embodiments of the present invention have been found to have a noticeably higher suction efficiency than known systems. Higher efficiency suction results in greater evacuation percentage of the tank contents prior to the pump losing prime. This results in lower liquid velocities and a reduction in turbulent fluid flow.

The higher efficiency suction of embodiments of the present invention have lower required pump vacuum pressure and consequently do not require the high engine speed (RPM) typically required to provide the necessary flow rate. This has been found to reduce wear on pump, engine, and drive train. A reduction in engine fuel consumed is also realized, yielding improved sustainability and other environmental benefits.

Higher efficiency suction, likewise, results in a reduction in heat generated during pump operation allowing longer continuous operation without overheating of the pump driving engine or heat related damage to the engine, transmission, or pump.

Low profile sump configured according to embodiments of the invention allows the truck end manufacturer to specify the location of the the sump and associated clean-out port without concern of parts and accessories installed by the truck chassis manufacturer, and not disclosed to the truck end manufacturer.

Low profile sump configured according to embodiments of the invention reduces the possibility of damage occurring while in shipment to the end truck manufacturer.

Low profile sump configured according to embodiments of the invention reduces the possibility of damage occurring during installation in the truck by the end truck manufacturer.

Low profile sump configured according to embodiments of the invention allows the end truck manufacturer to specify the tank prior to receipt of the truck cab and chassis which would normally be required to verify component locations.

Low profile sump has a reduced number of parts and required weldments thus reducing weight, manufacturing time, and results in improved product reliability and availability.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for evacuation of a fluid storage tank, the system comprising:
    a suction pipe disposed proximate to a bottom of said tank and having a major axis parallel to said bottom of said tank;
    said suction pipe having a single opening disposed in a sidewall thereof, on a side opposite to said bottom of said tank
    wherein said opening comprises a single arc section of said pipe being not greater than ½ a circumference of said pipe;
    a sump comprising a depression disposed within the bottom of said fluid storage tank; and
    said depression having a depth not greater than a thickness of said bottom of fluid storage tank; wherein said sump is offset from the suction pipe such that the opening of the suction pipe is not disposed over the sump.

2. The system of claim 1 wherein the sump is disposed in said bottom of said tank, said sump being disposed so that it is not in alignment with said opening.

3. The system of claim 2 wherein said sump is not more than 1 inch deep.

4. The system of claim 1 further comprising a terminus disposed within said tank at an end of said suction pipe.

5. The system of claim 1 further comprising a suction support.

6. The system of claim 5 wherein said suction support is disposed at an end of said suction pipe.

7. The system of claim 1 wherein said suction pipe has a circular cross section.

8. The system of claim 1 wherein said suction pipe has a rectilinear cross section.

9. The system of claim 1, wherein said depression is circular.

10. The system of claim 1 further comprising a cleanout aperture.

11. The system of claim 1 wherein said depression is rectangular.

\* \* \* \* \*